United States Patent
Wallance et al.

(10) Patent No.: US 8,321,173 B2
(45) Date of Patent: Nov. 27, 2012

(54) SYSTEM AND METHOD FOR USING MAGNETIC SENSORS TO TRACK THE POSITION OF AN OBJECT

(76) Inventors: Daniel I. Wallance, Larchmont, NY (US); Andrea L. M. Baker, Bristol, RI (US); Wojciech Krajewski, Somerville, MA (US)

(*) Notice: Subject to any disclaimer, the term of this patent is extended or adjusted under 35 U.S.C. 154(b) by 0 days.

(21) Appl. No.: 11/210,587

(22) Filed: Aug. 24, 2005

(65) Prior Publication Data

US 2006/0061354 A1    Mar. 23, 2006

Related U.S. Application Data

(60) Provisional application No. 60/604,346, filed on Aug. 25, 2004.

(51) Int. Cl.
*G06F 15/00* (2006.01)
*G06F 11/30* (2006.01)

(52) U.S. Cl. ........ 702/150; 702/104; 702/152; 702/186; 600/302

(58) Field of Classification Search ............ 702/150, 702/95, 35–40, 151–155, 104, 105, 186–188; 345/163, 158; 600/517, 593, 302, 547; 700/9, 700/10; 73/1.23, 1.79; 324/207.15, 658, 324/659, 660, 661, 662, 687, 457, 207.22; 342/448, 465, 450, 463; 340/539.13, 572.1; 455/456.1, 456.5

See application file for complete search history.

(56) References Cited

U.S. PATENT DOCUMENTS

| | | | |
|---|---|---|---|
| 3,541,541 A | 11/1970 | Engelbart | |
| 4,622,980 A * | 11/1986 | Kunig | 600/517 |
| 4,878,553 A | 11/1989 | Yamanami et al. | |
| 4,932,131 A | 6/1990 | McMurtry et al. | |
| 4,945,305 A | 7/1990 | Blood | |
| 4,950,987 A | 8/1990 | Vranish et al. | |
| 4,999,461 A | 3/1991 | Murakami et al. | |
| 5,028,745 A | 7/1991 | Yamanami et al. | |
| 5,042,486 A | 8/1991 | Pfeiler et al. | |
| 5,166,679 A | 11/1992 | Vranish et al. | |
| 5,214,388 A | 5/1993 | Vranish et al. | |
| 5,318,025 A | 6/1994 | Dumoulin et al. | |
| 5,373,245 A | 12/1994 | Vranish | |
| 5,442,347 A | 8/1995 | Vranish | |
| 5,525,901 A * | 6/1996 | Clymer et al. | 324/207.21 |
| 5,539,292 A | 7/1996 | Vranish | |
| 5,558,091 A * | 9/1996 | Acker et al. | 600/424 |
| 5,592,939 A | 1/1997 | Martinelli | |
| 5,726,581 A | 3/1998 | Vranish | |
| 5,757,288 A * | 5/1998 | Dixon et al. | 340/941 |

(Continued)

OTHER PUBLICATIONS

Analog Devices, Inc., "Analog Devices—Linear Output Magnetic Field Sensor—AD22151", 2003, Analog Devices, Inc., Norwood, MA.

(Continued)

*Primary Examiner* — Phuong Huynh
(74) *Attorney, Agent, or Firm* — Brandon N. Sklar, Esq.; Kaye Scholer LLP

(57) ABSTRACT

A method is provided for tracking an object's position. One or more semiconductor-based sensors obtain measurements of an energy field associated with the object. A processor applies an algorithm to the measurements to generate one or more values representing a position of the object in a coordinate system. The energy field may comprise a magnetic field, for example. The object may comprise a magnet, for example.

23 Claims, 7 Drawing Sheets

U.S. PATENT DOCUMENTS

| | | | |
|---|---|---|---|
| 5,834,709 | A | 11/1998 | Blonder et al. |
| 5,867,021 | A | 2/1999 | Hancock |
| 6,009,878 | A | 1/2000 | Weijand et al. |
| 6,073,043 | A * | 6/2000 | Schneider ............... 600/424 |
| 6,404,340 | B1 | 6/2002 | Paradiso et al. |
| 6,489,899 | B1 | 12/2002 | Ely et al. |
| 6,595,933 | B2 | 7/2003 | Sarvazyan et al. |
| 6,611,139 | B1 * | 8/2003 | Jackson ............... 324/207.2 |
| RE39,475 | E | 1/2007 | Murakami et al. |
| 7,160,258 | B2 * | 1/2007 | Imran et al. ............ 600/593 |
| 2002/0067342 | A1 * | 6/2002 | Proper ............... 345/163 |
| 2003/0038782 | A1 * | 2/2003 | Dobrich ............... 345/163 |
| 2003/0120448 | A1 * | 6/2003 | Moriya et al. ............ 702/95 |
| 2003/0155910 | A1 * | 8/2003 | Bartingale et al. ....... 324/207.24 |
| 2004/0236180 | A1 * | 11/2004 | Uchiyama et al. ........... 600/109 |
| 2004/0246230 | A1 * | 12/2004 | Oda et al. ............... 345/156 |
| 2005/0046608 | A1 * | 3/2005 | Schantz et al. ............ 342/127 |
| 2005/0165297 | A1 * | 7/2005 | Anderson et al. ........... 600/410 |
| 2006/0274040 | A1 | 12/2006 | Passaro et al. |

OTHER PUBLICATIONS

Honeywell International, "Smart Digital Magnetometer in the Laboratory—AN-200", Application Notes, Sep. 1996, Honeywell International, Morristown, NJ.

Honeywell International, "Magnetic Sensor Hybrid Application Circuit—AN-202", Application Notes, Sep. 1995, Honeywell International, Morristown, NJ.

Honeywell SSEC, "Magnetic Sensor Products", Brochure, Oct. 1996, Honeywell SSEC, Plymouth, MN.

Caruso, M., "Set/Reset Pulse Circuits for HMC1021/22—AN-207", Datasheets, Nov. 1997, Honeywell SSEC, Plymouth, MN.

Honeywell SSEC, "1- and 2-Axis Magnetic Sensors—HMC1001/1002 HMC1021/1022", Datasheets, Apr. 2000, Honeywell SSEC, Plymouth, MN.

Honeywell SSEC, "Three-Axis Magnetoresistive Sensor—HMC1023", Datasheets, Feb. 2000, Honeywell SSEC, Plymouth, MN.

Honeywell SSEC, "1 and 2-Axis Magnetic Sensors HMC1051 / HMC 1052", Datasheets, Jul. 2001, Honeywell SSEC, Plymouth, MN.

Honeywell SSEC, "2-Axis Magnetic Sensor—HMC1052L", Datasheets, Honeywell SSEC, Plymouth, MN.

Honeywell SSEC, "3-Axis Magnetic Sensor—HMC1053", Datasheets, Honeywell SSEC, Plymouth, MN.

Honeywell SSEC, "Three-Axis Magnetic Sensor Hybrid—HMC2003", Datasheets, Oct. 1997, Honeywell SSEC, Plymouth, MN.

Honeywell International, "Smart Digital Magnetometer—HMR2300", Datasheets, Jun. 1997, Honeywell International, Morristown, NJ.

Honeywell International, "Three-Axis Strapdown Magnetometer—HMR2300r", Datasheets, Jan. 1999, Honeywell International, Morristown, NJ.

Honeywell SSEC, "Linear Position Sensor Module—HMR4001", Datasheets, Jun. 2001, Honeywell SSEC, Plymouth, MN.

Honeywell SSEC, "Linear Position Sensor Module—HMR4007", Datasheets, Jan. 2003, Honeywell SSEC, Plymouth, MN.

Honeywell SSEC, "Magnetic & Pressure Products", Brochure, Jun. 2000, Honeywell SSEC, Plymouth, MN.

NVE Corporation, "GMR Magnetic Field Sensors—AA002-AA006 Series", Datasheets, NVE Corporation, Eden Praire, MN.

NVE Corporation, "GMR Sensors Data Book", Databook, Apr. 2003, NVE Corporation, Eden Praire, MN.

Philips Electronics N.V., "KMZ10A1 Magnetic Field Sensor", Datasheet, Apr. 1998, Philips Electronics N.V., Netherlands.

Philips Electronics N.V., "KMZ10B Magnetic Field Sensor", Datasheet, Mar. 1998, Philips Electronics N.V., Netherlands.

Philips Electronics N.V., "KMZ10C Magnetic Field Sensor", Datasheet, Mar. 1998, Philips Electronics N.V., Netherlands.

Philips Electronics N.V., "KMZ51 Magnetic Field Sensor", Datasheet, Jun. 2000, Philips Electronics, N.V., Netherlands.

Philips Electronics N.V., "KMZ52 Magnetic Field Sensor", Datasheet, Jun. 2000, Philips Electronic N.V., Netherlands.

Sentron AG, "Single-Axis Magnetic Sensor 1SA-1V", Datasheet, Apr. 2003, Sentron AG, Switzerland.

Sentron AG, "Integrated 2-Axis Hall Element 2D-VH-11", Specification, Mar. 2000, Sentron AG, Switzerland.

Sentron AG, "Integrated 2-Axis Hall Sensor 2SA-10", Datasheet, Apr. 2003, Sentron AG, Switzerland.

Sentron AG, "Integrated 3-Axis Hall Element 3D-H-30", Specification, Mar. 2000, Sentron AG, Switzerland.

Sentron AG, "Sentron 3-Axis Hall Device Kit", Manual, Jan. 1999, Sentron AG, Switzerland.

AMT, "Sensors & Systems—MIAPS—Ingestible Sensors for the real time Measurement of Intestinal Activity in an Ambulant Physiological Setting" Research Summary, http://www.amt.ul.ie/research.htm, University of Limerick, Ireland.

Barton, J.; Delaney, K.; O'Mathuna, C.; Paradiso, J.A., "Miniaturised Modular Wireless Sensor Networks", 2002, National Microelectronic Research Centre, Ireland.

Schott, C.; Racz, R.; Betschart, F.; Popovic, R. S., "Novel Magnetic Displacement Sensors", Technical Notes, Sentron AG, Switzerland.

Meneroud, P., "Resonant Magnetic Sensors and their Applications for Remote Sensing", Flux Magazine, Oct. 1997, CEDRAT Groupe, France.

Sai, B.; Ligthart, L.P., "Detection and Imaging of Small Buried 3D Non-Metallic Objects with Multistatic Phase-Based GPR Signatures", Geoscience and Remote Sensing Symposium, Jun. 2002, pp. 1988-1990, vol. 4, Department of Electrical Engineering, Delft University of Technology, Netherlands.

Matter, N., "Design Ideas: Basic Sensors", Stanford Natcar 2000: Design Ideas, Apr. 2000, Stanford University, Stanford, CA.

Anderson, J.; Nordman, C.; Tondra, M.; Schneider, R. W.; Sinclair, R. A., "Magnetic Anomaly Sensing for Landmine Alternative Systems", National Defense Industrial Association 2002 Mines, Demolition and Non-Lethal Conference, Jun. 3-5, 2002, Tampa, Fl.

Department of Defense and Department of Transportation, "2001 Federal Radionavigational Plan", Governmental Report, Department of Defense and Department of Transportation, 2001, Springfield, VA.

Speake & Co Limited, "FGM-Series—Magnetic Field Sensors", Application Note, Speake & Co. Llanfapley, Monmouthshire, Wales.

F.W. Bell Inc., "Bulk Indium Arsenide BH-703/706", Datasheet, Sypris Solutions Inc., Apr. 2003, Louisville, KY.

Sentron AG, "Sentron Hall Device Kit", Datasheet, Nov. 1998, Sentron AG, Switzerland.

Hightower, J.; Borriello, G.; Want, R., "SpotOn: An Indoor 3D Location Sensing Technology Based on RF Signal Strength", Technical Report, Feb. 2000, University of Washington, Seattle, WA.

Hightower, J., "Location Sensing: A Framework of Techniques and a Taxonomy of System Properties", General Exam, Jun. 2001, University of Washington, Seattle, WA.

Paradiso, J.; Hsiao, K., "Swept-Frequency, Magnetically-Couple Resonant Tags for Realtime, Continuous, Multiparameter Control", Presentation Summary, Apr. 1999, MIT Media Laboratory, Cambridge, MA.

Hsiao, K.; Paradiso, J., "A New Continuous Multimodal Musical Controller Using Wireless Magnetic Tags", Presentation Summary, Oct. 1999, MIT Media Laboratory, Cambridge, MA.

Hsiao, K., "Fast Multi-Axis Tracking of Magnetically-Resonant Passive Tags: Methods and Application", Report, Feb. 2001, Massachusetts Institute of Technology, Cambridge, MA.

Given Imaging Ltd., "Given Diagnostic System", Brochure, 2004, Given Imaging Ltd., Duluth, GA.

Ward, A.; Steggles, P.; Curwen, R.; Webster, P., "Sentient Computing Project Home Page", Web page, http://www.cl.cam.ac.uk/research/dtg/attarchive/spirit/, 2001, AT&T Laboratories Cambridge, U.K.

Iddan, G.J.; Swain, C.P., "History and Development of Capsule Endoscopy" Gastrointestinal Endoscopy Clinics of North America, pp. 1-9, vol. 14, Issue 1, W.B. Saunders Co., Philadelphia, PA.

Versweyveld, L., "Swallowable Camera-Capsule to Visualise Gastrointestinal Tract From Patient's Interior", Web Article, http://www.hoise.com/vmw/00/articles/vmw/LV-VM-08-00-25.html, Jun. 2000, Virtual Medical Worlds, Benelux.

Mallett, J., "New Camera Shines Light on Endoscopic Examinations", Web Article, http://www.body1.com/news/index.cfm/6/17/1, May 2000, 2000 Medical Data International, Inc.

3Dconnexion, "SpaceBall 5000—Premium Motion Controller", Datasheet, 2003, 3Dconnexion, San Jose, CA.

Friedman, M., "3D Medical Positioning", Research Abstract, 2001, University of Minnesota, Minneapolis, MN.

Sensopad Limited, "Sensopad Technology Overview—Version 1.0", Product Overview, Mar. 2001, Sensopad Limited, Cambridge, England.

Howard, M., "Sensopad Technology White Paper—Multiple Sensor Systems—Version 1.0", Overview, Dec. 2002, Sensopad Limited, Cambridge, England.

Sensopad Limited, "Sensopad Versatile Technology Overview—Version 1.0", Product Overview, Nov. 2003, Sensopad Limited, Cambridge, England.

Synaptics, Inc., "Synaptics TouchPad Interfacing Guide" Product Guide, Jan. 2001, Synaptics, Inc., San Jose CA.

Hubschmann et al; "Magnetoresistive Sensors Principles, of Operation and Applications"; pp. 1-10, Application Note 20, Issue 1, Zetex, Apr. 1996.

Howard Mason; "Basic Introduction to the use of Magnetoresistive Sensors"; pp. 1-20, Application Note 37, Issue 1, Zetex Semiconductors, Sep. 2003.

Bratland, Tamara, "Linear Position Sensing Using Magnetoresistive Sensors"; Sensor 2001. 10th Int. Conference. Proceedings, Nuremberg, D, May 8-10, 2001.

* cited by examiner

| 480 | 481 | 482 | 483 | 484 | 485 | 486 | 487 | 488 | 489 |
|---|---|---|---|---|---|---|---|---|---|
| (x, y, z) Coordinates | S1 | S2 | S3 | S4 | S5 | S6 | S7 | S8 | S9 |
| (x1, y1, z1) | α-1 | α-2 | α-3 | α-4 | α-5 | α-6 | α-7 | α-8 | α-9 |
| (x2, y2, z2) | β-1 | β-2 | β-3 | β-4 | β-5 | β-6 | β-7 | β-8 | β-9 |
| (x3, y3, z3) | | | | | | | | | |

477

493, 494

Fig. 5

SYSTEM AND METHOD FOR USING MAGNETIC SENSORS TO TRACK THE POSITION OF AN OBJECT

RELATED APPLICATION

This application claims the benefit of U.S. Provisional Patent Application No. 60/604,346, which was filed on Aug. 25, 2004 and is incorporated by reference herein.

FIELD OF THE INVENTION

The invention relates to systems and methods for tracking the position of an object, and, more particularly, to such systems and methods that use measurement of magnetic/electromagnetic fields and/or signals to obtain information about the object in question.

BACKGROUND OF THE INVENTION

There is a constant need for technologies capable of tracking an object's position. In the field of transportation, there is a need to track the position of ships, airplanes, vehicles, etc. Military activities have always required the use of position tracking, such as the need to determine the position of a bombing target. Law enforcement agencies frequently need to determine the position of a subject individual or object, such as a package of contraband, within a search area. On a smaller scale, there is a need for technology to track precisely an object's position within a small volume. For example, three-dimensional computer design tools for animated films often map the position of one or more optical position reflectors located on selected portions of an actor's body. In the field of medicine, position tracking is frequently used, for example to locate the position of a tumor. In one example, gamma ray sources are injected into a patient and accumulate at the location of a tumor, identifying its position.

A variety of position tracking technologies have been developed to determine the location of an object of interest from a distance. At global distances GPS provides position tracking for aircraft, land vehicles, ships, hikers, explorers, etc. Radio frequency time-delay systems such as Long Range Navigation (LORAN) also provide position tracking capability, for example for ships. Radar is another tool widely used to track objects. Air traffic controllers use radar to track airplanes on the ground and in the air, NASA uses radar to track space debris, the military uses radar to detect enemy positions and to guide weapons, and meteorologists use radar to track storms, hurricanes, and tornadoes. At smaller distances, such as within spaces confined to a building or even a room, time delay sensing is also practical, as the distance between a target and receiver is still large enough to produce a measurable delay. Another technology that may be used at these distances is ultrasound. In ultrasound systems, a receiver/transmitter mounted in the tracking space, such as a room, emits a pulse and listens for an echo as it reflects back from the target.

At even smaller distances, such as for a volume of several cubic feet or less, the above-described position detection systems become currently impractical or unworkable. The operational space of such size is too small for measuring a radio frequency time delay in a practical and easily implemented manner. If a radio-frequency transmitter were mounted within such a volume, the distance between the transmitter and any object within the volume may be too small to measure a time-delay with the precision needed for position tracking in most applications. Ultrasound also fails on a small scale, for reasons similar to those described above.

Various optical techniques exist to wirelessly track position within a small volume, for example, by using multiple infrared lasers; however, these systems require the target object to remain in constant view of the tracking system, thus limiting the systems' usefulness.

Another approach to position tracking at small distances is to detect fluctuations in a magnetic field/radio signal. For example, U.S. Pat. No. 6,404,340 discloses a system that uses three pairs of coils positioned in a cubical configuration. The coils generate a substantially uniform magnetic field within a defined region. The coils, when energized, produce a signal that sweeps throughout a predetermined range of frequencies. A magnetic resonance tag is placed within the field; when energized at its resonance frequency, the tag retransmits a signal which is detected by the system and is used to determine the tag's position.

SUMMARY OF THE INVENTION

Embodiments of the invention are directed to a wireless and real-time small-scale position tracking device, which may be used, for example, to construct and operate a three-dimensional computer mouse. A three-dimensional computer mouse containing, for example, a small magnet, may be operated within a defined three-dimensional volume to allow the position of the magnet, and thus the mouse, to be determined at all times.

Accordingly, a method is provided for tracking an object's position, comprising measuring an energy field associated with the object by one or more semiconductor-based sensors to obtain one or more measurements, and applying an algorithm to the measurements to generate one or more values representing a position of the object in a coordinate system. The energy field may comprise a magnetic field, for example. In one example, nine sensors are used to obtain multiple measurements of the energy field associated with the object. The object may comprise a magnet, for example. Alternatively, the object may comprise a resonant capacitor-inductor circuit (LC) circuit.

In one example, the method further comprises examining a look-up table comprising at least one set of one or more coordinates representing a location, and a set of one or more values representing components of an energy field. A record holding a set of values at least substantially matching the one or more measurements is identified, and the position of the object is determined to be equal to the set of coordinates stored in the identified record. Alternatively, a best-fit equation may be applied to the one or more measurements to generate one or more values representing a position of the object in a coordinate system.

A position tracking system is also provided, comprising an object configured to generate an energy field and one or more semiconductor-based sensors configured to obtain measurements of the energy field. The position tracking system further comprises a processor programmed to apply an algorithm to the measurements to generate one or more values representing a position of the object in a coordinate system. The object may be configured to generate a magnetic field, for example. In one example, nine sensors are used to obtain multiple measurements of the energy field associated with the object. The object may comprise a magnet, or alternatively, an LC circuit. The system may further comprise storage for storing a look-up table comprising at least one set of one or more coordinates representing a location and a set of one or more values representing components of an energy field. In this example, the processor is further programmed to examine the look-up table and identify a record holding a set of values at least substantially matching the one or more measurements. The processor then determines the position of the object to be equal to the set of coordinates stored in the identified record.

The one or more semiconductor-based sensors may obtain the one or more measurements of the energy field wirelessly. In some embodiments, the object is not connected to the sensing device. The processor may comprise software, and may include a multithreaded program architecture.

The methods and systems described herein may be applied in a three-dimensional computer mouse system, for example. The object configured to generate an energy field may function as a computer mouse device (or as a portion of a computer mouse device), for example. Such a device may be provided in the shape of a ring to be worn on a user's finger.

BRIEF DESCRIPTION OF THE DRAWINGS

Further objects, features and advantages of the invention will become apparent from the following detailed description taken in conjunction with the accompanying drawing showing an illustrative embodiment of the invention, in which:

FIG. 5 is an example of a look-up table, in accordance with the embodiment of FIG. 1;

DETAILED DESCRIPTION

Embodiments of the invention are directed to a wireless and real-time small-scale position tracking device, which may be used, for example, to construct and operate a three-dimensional computer mouse. A standard computer mouse is limited to two-dimensional movement. A three-dimensional computer mouse containing, for example, a small magnet, may be operated within a defined three-dimensional volume to allow the position of the mouse to be determined at all times. Such a three-dimensional computer mouse may be used in applications ranging from 3D computer aided design (CAD) development, to 3D computer gaming.

Figure 1:
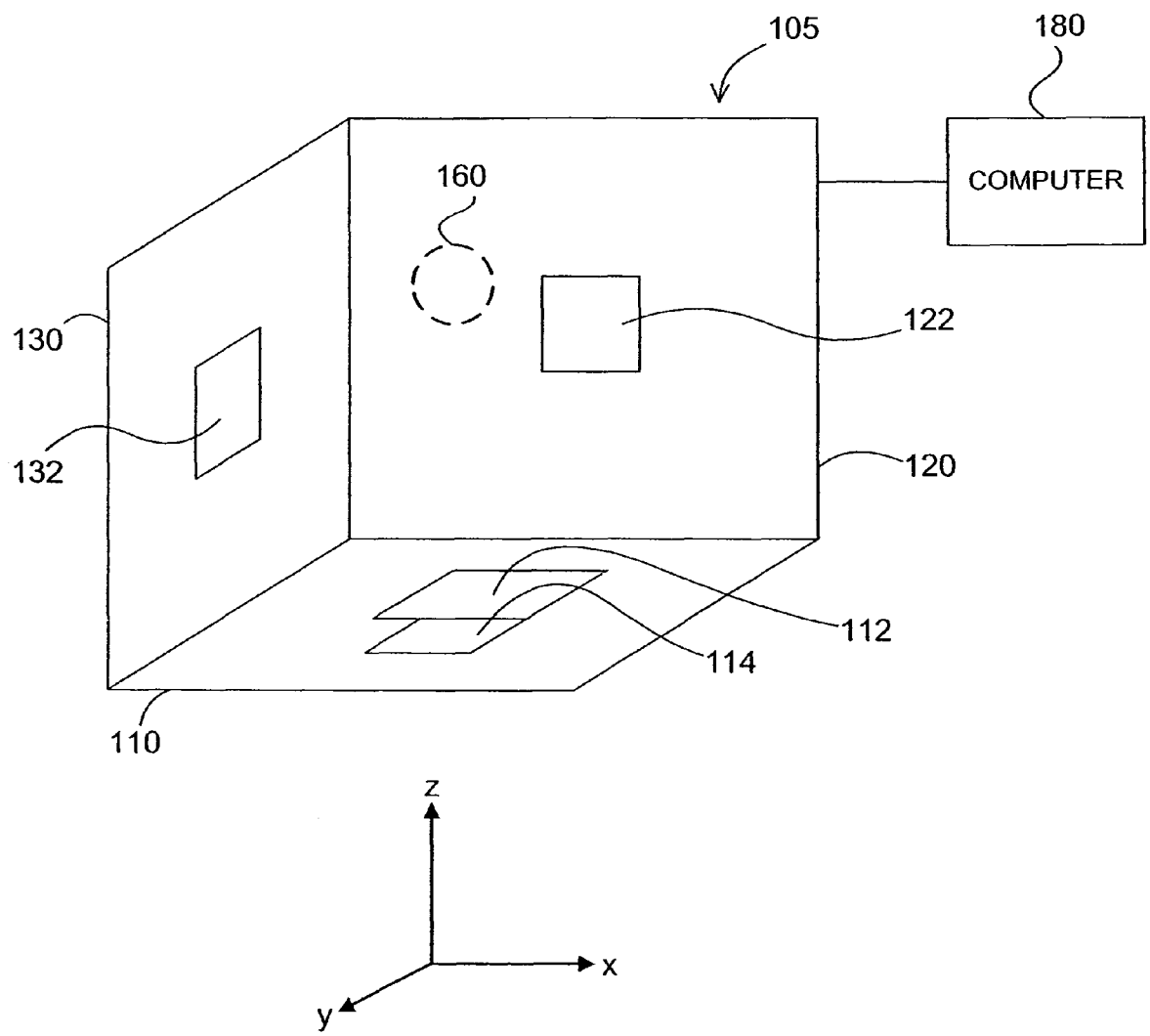
FIG. 1 is an example of a tracking system, in accordance with an embodiment of the invention.

FIG. 1 is an example of a tracking system 100, in accordance with an embodiment of the invention. The tracking system 100 comprises a sensing device 105, a target object 160, and a computer 180. The target object 160 may move about within a volume defined by the physical characteristics of the sensing device 105. As long as the target object is located within this volume, sensors located on the sensing device detect components of the magnetic field associated with the target object 160. The computer 180 analyzes the measurements generated by the sensors and determines the object's three-dimensional location.

In this example, the sensing device 105 comprises three operational platforms 110, 120, and 130 configured to define a three-dimensional (3D) volume having an x-y-z coordinate system. The first platform 110 defines an x-y plane, the second platform 120 defines an x-z plane, and the third platform 130 defines a y-z plane. Each operational platform is attached by two sides to another platform. In this example, each of the platforms 110, 120, and 130 is of a substantially square shape, and the three platforms have substantially the same dimensions. Therefore, the platforms 110, 120, 130 define three sides of a substantially cubical volume. This cubical volume is referred to as the "tracking volume."

The target object 160 comprises a magnetic substance or an object capable of producing a magnetic field or signal. The target object 160 thus generates a magnetic field. It should be noted that while in FIG. 1 the target object is depicted as a round shape, in other examples the target object 160 may have other shapes. It should also be noted that although only one target object is depicted in FIG. 1, alternative embodiments of the invention include multiple target objects and the respective positions of multiple target objects may be tracked in such an alternative embodiment.

When the target object 160 is located within the tracking volume, the magnetic sensors located on the sensor boards 112, 122, 132 measure components of the target object's magnetic field. These measurements are analyzed by software on the computer 180 to determine the location of the target object 160. It should be noted that in other examples, the platforms 110, 120, 130 may have other shapes and sizes. Additionally, the three platforms 110, 120, 130 may not have substantially the same shapes or dimensions as each other.

Each platform 110, 120, 130 supports a sensor board comprising one or more magnetic sensors capable of detecting components of the magnetic field generated by the target object 160. Thus, the platform 110 supports a first sensor board 112, the platform 120 supports a second sensor board 122, and the platform 130 supports a third sensor board 132. A main control board 114 is located on the platform 110 (in this example, the sensing device 105 includes only one main control board).

Each of the platforms 110, 120 and 130 may be constructed using a magnetically inert and non-metallic substance, such as plastic, for example. Alternatively, other substances, including metallic substances, may be used. The dimensions of each may be chosen based on the operational distance of the magnetic sensors located on sensor boards 112, 122 and 132 (described below) and the intensity of the magnetic or electromagnetic field produced by the target object 160. Preferably, the height (thickness) of each platform is of sufficient distance that the sensors are not saturated by the target object's field, as a physical barrier. Alternatively, a height may be chosen of minimal height, the circuit board plus components and adequate room for mounting and protective space. The length and width of each operational platform are directly dependent on the sensitivity of the magnetic sensors, the intensity of the field emitted from the target object 160 and the desired operating area. The area is preferably of sufficient size to allow for operation of the target application but small enough to prevent sensitivity degradation at the edges of each operational platform. In the example shown in FIG. 1, each platform was approximately 30 cm by 30 cm by 4 cm.

The target object 160 moves within the tracking volume defined by the platforms 110, 120, and 130. The target object 160 may comprise a small but strong magnet, having a strength that is selected based on the size of the operational platforms 110, 120, and 130 and the sensitivity of the magnetic sensors that are described below.

Sensor Boards

In the example shown in FIG. 1, each sensor board 112, 122, 132 holds three magnetic sensors; thus the entire sensing device 105 comprises nine magnetic sensors for detecting the magnetic field of the target object 160. However, because the sensor boards 112, 122, 132 in this example are configured similarly, only sensor board 112 is described herein.

Figure 2:
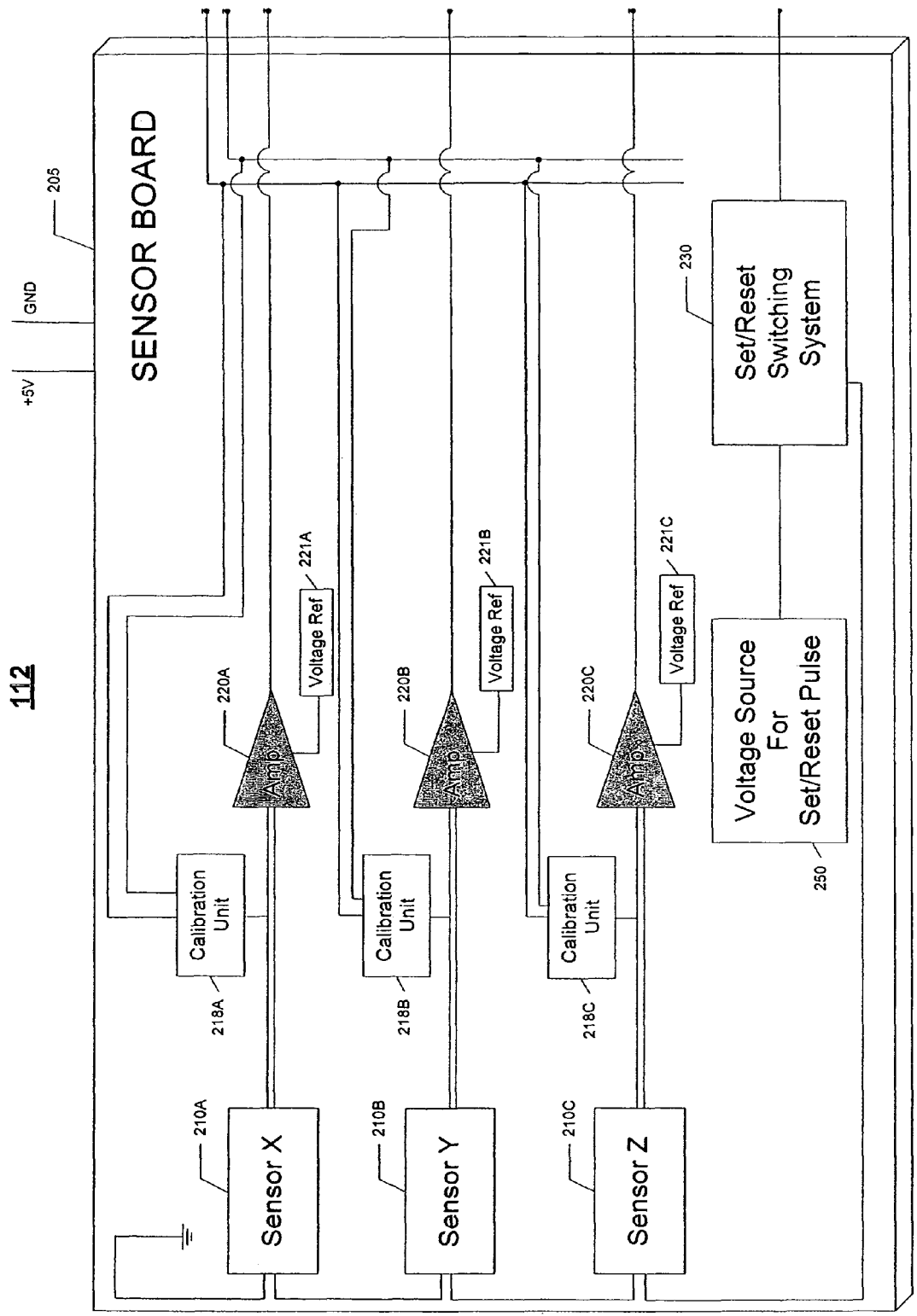
FIG. 2 is an example of a sensor board, in accordance with the embodiment of FIG. 1.

FIG. 2 illustrates an example of the sensor board 12, in accordance with an embodiment of the invention. The sensor board 112 is mounted substantially in the center of the operational platform 110. The sensor board 112 comprises a circuit board 205 containing three magnetic sensors 210A, 210B and 210C. In one example, the three sensors 210A-C are aligned in a mutually orthogonal configuration. Each magnetic sensor 210A-C is connected serially to a respective-amplifier 220A-C. The sensor board 112 also comprises a set/reset switching system 230, and a voltage source 250. A respective voltage reference unit 221A-C is connected to the respective amplifier and a respective calibration unit 218A-C is connected to one of the input lines of each respective amplifier 220A-C.

It should be noted that each sensor on the sensor board may be individually mounted; alternatively, the X, Y, and Z sensors are available in multiple preconfigured packages such as an X and a Y sensor in a single integrated circuit (IC) or a single IC containing an X, Y, and Z sensor. Any of these packages or a combination thereof may be used as long as the desired number of sensors is used. The location of supporting circuitry on each respective sensor board may be varied as long as it does not cause interference with the sensors on the sensor board.

The physical layout of the sensor board 112 may be selected to minimize interference and maximize the sensitivity and region of the operating area. In the example shown in FIG. 1, a ribbon cable (not shown) connects the sensor boards 112, 122, 132 to the main control board (described below). In this example, the cable comprises a ground, five volts, set/reset signal, and three signal lines, one for each sensor. The cable also includes calibration lines. Three such cables may be used (one per sensor board). To reduce interference, and to provide balance, multiple ground and power lines may be used, one ground in between each active line on the ribbon cable.

Magnetic Sensors

Each magnetic sensor 210A-C is aligned to detect a component of the magnetic field generated by the target object 160 and generates an electrical signal in response. The magnetic sensor 210A is aligned to measure the x-component of the magnetic field, the magnetic sensor 2101B is aligned to measure the y-component of the magnetic field, and the magnetic sensor 210C is aligned to measure the z-component of the magnetic field. As discussed above, the three sensors 210A-C may be aligned in a mutually orthogonal configuration. Each sensor 210A-C transmits its output signal through a respective amplifier 220A-C.

The selection/design of the magnetic sensors 210A-C is determined by various factors. For example, in designing/selecting a sensor, it is preferable to select a sensor with an output proportional to the magnetic field strength and thus the proximity of the magnet or target object. High sensitivity is also desirable, increasing operational range and allowing for target objects with low strength fields, such as an LC circuit. The operational bandwidth should be wide enough to remove the high frequency bottleneck resulting from real time object tracking. An example of a magnetic sensor that may be used for magnetic sensors 210A and 2101B is the Honeywell HMC1022 magnetoresistive sensor, to measure the x- and y-components of a magnetic field (two individual sensors in a single package offset by ninety-degrees). The Honeywell HMC1022 magnetoresistive sensor is available from Honeywell International Inc., located in Morristown, N.J. An example of a magnetic sensor that may be used for sensor 210C is the Honeywell HMC1021Z to measure the z-component of the magnetic field. This sensor is vertically mountable with regard to the sensor board to which the sensor is mounted. Aside from the packaging style and number of sensitive axes, and the direction of the sensitive axis, there is no significant difference between the HMC1022 and the HMC102Z. For the Honeywell HMC1022 and HMC1021Z sensors, when a voltage is connected, the result is a differential output based on an applied magnetic field. Additionally, each sensor detects the presence of a magnetic field in a single direction, and the output varies based on the strength and direction of the magnetic field. For the HMC sensors the key pins are a differential pair of outputs, positive and negative connections for the set/reset straps, and the offset straps specific to the selected sensor.

Amplifiers

Each amplifier 220A-C magnifies the difference between the two signals received from its respective magnetic sensor 210A-C and transmits the amplified signal to the control board 114. As already mentioned, if the HMC sensors described above are used, each sensor 210A-C generates a differential output; accordingly each differential amplifier 220A-C subtracts the common signal and amplifies the difference. It is preferable to use an amplifier having the following characteristics: its gain is easily set with a range from one to one thousand, it has the ability to implement a low pass filter, it requires a single power supply, and it has the ability to attach a reference voltage. In this example, the AMP04 amplifier may be used. The AMP04 amplifier is available from Analog Devices Inc., which is located at Norwood, Mass. In configuring the amplifier 220A-C, a gain may be selected to allow for operation at an ample distance. In one example, a gain of 147 may be selected. The selected low frequency cutoff is dependent on the frequency of the target object. In one example, the low frequency cutoff may be set at 1.59 kHz. It should be noted that in alternative embodiments, a magnetic sensor containing an internal amplifier may be used, in which case a separate amplifier may not be necessary.

Reference Voltage

The reference voltage units 221A-C establish reference voltages for their respective amplifiers 220A-C, allowing each respective amplifier's output voltage to vary in a positive and negative direction. Due to the nature of the magnetic sensors 210A-C, depending on the position of the target object 160 with respect to a particular magnetic sensor, the resulting output voltage can either swing negative or positive. In one example, assuming a five volt supply is used to power the amplifier, a suitable reference is half the value or 2.5 volts.

Calibration Unit

Each calibration unit 218A-C, upon request, calibrates its respective sensor so that in the absence of a target object within the magnetic field, the output of its respective amplifier is at the value of the reference voltage (the amplifier's effective zero value). Calibration units 218A-C are connected to the inputs of the respective amplifiers 220A-C. It is preferable for the output of each amplifier 220A-C to be the reference voltage, and the sensor differential output to be as close to zero as possible, when no magnetic field is present and no ferrous or metallic object is within range of the sensors. Such a configuration may be useful to ensure repeatable and precise position tracking. Typically, interference may persist even when no metallic object is within range, such as from surrounding components or ambient fields, but nevertheless, it is preferable to null the effect of these fields. In one example of the invention, because sensor calibration can only occur in the absence of the aforementioned target objects, a push button may be used to initiate calibration. In this case, following activation, the microcontroller reads the amplifier output from the sensor to be calibrated. A control line connected to the calibration unit is used to change the calibration unit's resistance, in order to pass additional voltage into the amplifier, effectively reducing the input differential to zero. The additional voltage may remain until the sensors are recalibrated. In the event that offset straps are implemented in the sensor IC package, the calibration output is more effectively fed into the offset strap to cancel any ambient field. The concept is similar to calibrating the magnetic sensors by adding voltage to the input of the amplifiers. To use the offset straps, a current, so as calculated when the target object 160 is not within the tracking volume, is driven through the straps that directly cancels out any ambient field when the target object is not within the sensitive volume. Passing additional voltage as described above, an I²C interface digital potentiometer is desirable. One such unit is the MAX5417, available from Maxim Integrated Products, Inc. located in Sunnyvale, Calif. Alternatively, calibration may be performed while the target object 160 remains at a known location within the tracking volume. In such case, the calibration algorithm may compensate for the target object's field when it nulls any undesirable interference.

Set/Reset Switching System

Set/reset switching system 230 maintains the sensitivity of the magnetic sensors 210A-C. Sensitivity is a factor regardless of the sensors chosen. For example, the Honeywell HMC sensors may lose their sensitivity unless actively pulsed with a high current through onboard straps, referred to as set/reset straps. Applying a very strong but brief current pulse repeatedly through the set/reset straps will restore sensitivity. Typically, although dependent on the specific sensor, a current of between 0.5 and 4.0 Amps lasting for two microseconds is pulsed through the set/reset straps for the Honeywell HMC sensor as previously described. Additionally, a given pulse's decay can never reverse polarity in that after a positive current pulse, the voltage does not drop negative and after a negative current, the voltage cannot become positive until a later pulse is sent. The resulting pulsing system is controlled by the microcontroller to be described later, but is broken into two segments, a switching circuitry to control current flow and circuitry to produce an adequate voltage. Although the specific characteristics such as needed voltage and current are dependent on the selected sensor, the following design is generally universal. In one embodiment, an IRF7105 power MOSFET (an N and P channel MOSFET pair) may be suitable for controlling current flow. The IRF7105 power MOSFET is available from International Rectifier, located at El Segundo, Calif. Specific requirements for the MOSFET pair, which are again dependent on the specific sensor selected, are a low ON resistance, the externally attached charge capacitor must be a quick, high frequency discharging capacitor, most likely a Tantalum capacitor, and a resistor capacitor (RC) combination circuit with a two microsecond timeconstant may be needed to turn the MOSFET pair off after a short period of time to prevent a DC current from flowing through the straps.

Voltage Source for Set/Reset Pulse

The voltage source 250 produces a sufficient set/reset voltage that the set/reset switching system 230 pulses to the sensors 210A-C to maintain sensitivity. In this example, a MAX662A +12 Volt DC to DC power supply, available from Maxim Integrated Products, may be used to produce the desired reset voltage. The microcontroller 320 must initiate the switching current pulse, alternating between high to low and low to high pulses. The voltage drive for the switching circuitry, delivered by the MAX662A, is again dependent on the selected sensors, but for the Honeywell sensors, a voltage of 12 Volts is desirable.

In addition, a switching circuitry and power supply set is present, but not shown, on each of the three separate sensor boards 112, 122, 132. With such a configuration, only a set/reset command needs to be transmitted from the control board, the microcontroller is protected, and system efficiency is improved in that the high current pulse is not transmitted over a long distance.

The output of the set/reset circuitry is connected to the set/reset straps of the three magnetic sensors per board. Each sensor's set/reset strap is subsequently connected to the next sensor's set/reset strap in either a parallel or series configuration terminating to ground on the given sensor board. The desired configuration is dependent on how much current is needed to be passed through the set/reset straps as dictated by the characteristics of the magnetic sensors.

The output of amplifiers 220A-C is transmitted to control board 114. Similarly, the output of the three amplifiers on sensor board 122 and the three amplifiers on sensor board 132 are transmitted to the control board 114.

Control Board

Figure 3:
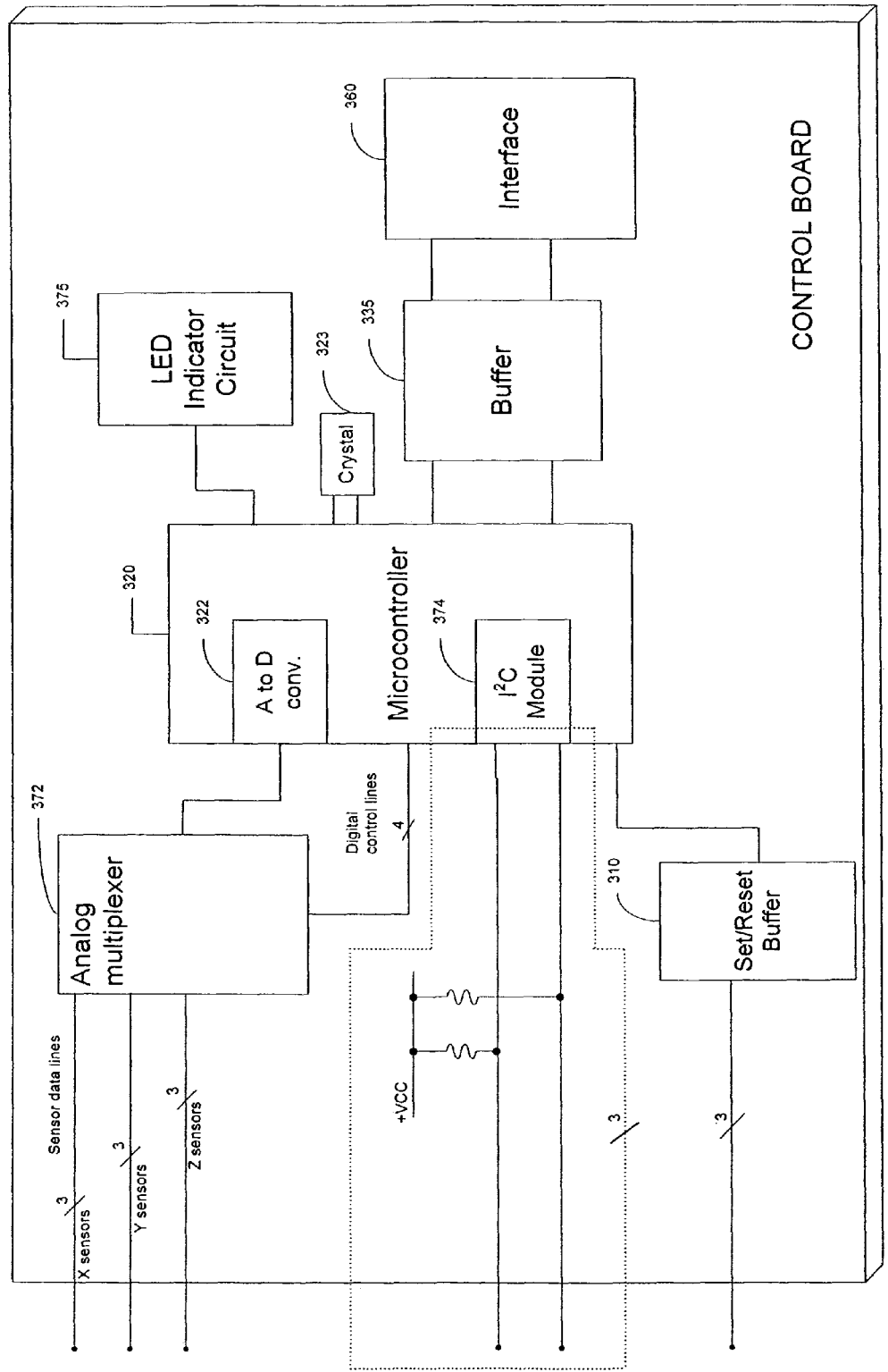
FIG. 3 is an example of a control board, in accordance with the embodiment of FIG. 1.

FIG. 3 is an example of a control board 114. The control board 114 holds the microcontroller 320 and related circuitry. In the example shown in FIG. 3, the control board 114 comprises a set/reset buffer 310, an analog multiplexer 372, a microcontroller 320, an LED indicator circuit 375, a buffer 335, a crystal 323, and an interface 360. The previously described data and power cables, one for each sensor board, connect to the control board with the resulting signals feeding into the appropriate locations.

Analog Multiplexer

The analog multiplexer 372 receives the output signals generated by the nine amplifiers located on sensor boards 112, 122, and 132. The signals are then passed to the microcontroller 320 by way of the multiplexer output line as dictated by the microcontroller 320 through the four control lines. The selected output signal subsequently enters the analog-to-digital converter 322 in the microcontroller 320 for conversion to a digital signal. One commercially available multiplexer that may be used is the HCF4067B ANALOG SINGLE 16 CHANNEL MULTIPLEXER/DEMULTIPLEXER, available from ST Microelectronics, located in San Jose, Calif., for example. In the example shown in FIG. 3, the analog multiplexer 372 receives nine sensor output signals, three from each sensor board 112, 122, 132. Alternatively, a multiplexer may not be necessary if there are a sufficient number of available ports on the microcontroller to which the nine sensor output lines can connect for analog-to-digital conversion.

Microcontroller

The microcontroller 320 receives a multiplexed signal from the analog multiplexer 372 and feeds data to the computer 180, as directed by the computer. In the example shown in FIG. 3, the microcontroller 320 also converts the analog signals received from the multiplexer 372 to digital form. The microcontroller 320 additionally controls the calibration units located on the sensor boards 112, 122, and 132 and the set/reset pulses. Connected to the microcontroller 320 are three sets of two wire bus lines that connect to each of the three sensor boards and subsequently the three calibrators on each board connect to the two-wire bus. The microcontroller 320 uses a software-based I²C module 374 to control the I²C digital potentiometers using a bit-banging routine. Upon a manual calibration initiation request, the microcontroller 320 automatically continually reads each sensor's amplifier output while adjusting the digital potentiometer until the resulting output of the amplifiers is at the zero level or reference voltage.

The microcontroller 320 may include software. In this example, the microcontroller 320 comprises an internal analog-to-digital converter 322 which converts the signals received from the analog multiplexer 372 to digital signals. Alternatively, an external analog-to-digital converter may be used. Also in this example, the microcontroller 320 also comprises an $I^2C$ module 374 which controls the calibration units 218A-C via three two-wire buses. An external serial port is used for communication with the computer 180; however, the microcontroller 320 may communicate with the computer 180 in other ways, such as via a Universal Serial Bus (USB) Port, a parallel port, PS/2 port, a wireless connection such as wireless Ethernet (802.11x) or Bluetooth, Ethernet, etc. In the example shown in FIG. 3, the PIC16F877 microcontroller, manufactured by Microchip Technology Inc., located in Chandler, Ariz., is used.

To enable communication between the microcontroller 320 and the computer 180, a standard serial port speed of 38.4 Kbps may be used, and a 18.432 MHz crystal oscillator is used. It should be noted that these values were selected based on the characteristics of the PIC16F877 microcontroller described above. Different crystal oscillator and serial speeds may be suitable depending on the microcontroller selected.

The calibrator control lines by way of the $I^2C$ bus and signal output line from the multiplexer 372 along with the four digital control lines located on the control board 114 are connected to the microcontroller 320. The multiplexer 372 serves as an intermediate stage between the amplifiers on each sensor board 112, 122, 132, and the input ports of the microcontroller's internal analog-to-digital converter 322. Additionally, the three set/reset lines, one per sensor board, are also connected to the microcontroller 320 by way of the set/reset buffer 310.

Set/Reset Buffer

The set/reset buffer 310 provides additional current to compensate for the microcontroller's current limitations. If the PIC16F877 microcontroller is used, the microcontroller 320 is unable to source and sink more than 25 mA per IO pin. As a solution, a transistor circuit where the transistors are either off or in saturation as a digital signal may be used. One such circuit comprises two 2N3904 NPN General Purpose Amplifiers, one 2N3906 PNP General Purpose Amplifier and two resistors. The 2N3904 and 2N3906 devices are available from Fairchild Semiconductor International Inc., located at South Portland, Me. Powered by five volts, the set/reset buffer 310 connects between the set/reset signal from the microcontroller 320 and the set/reset sensor lines.

Buffer

The buffer 335 in the example shown in FIG. 3 converts the output of the microcontroller 320 to a signal appropriate for processing by the computer 180. The microcontroller 320 is preferably able to both receive and transmit signals over the interface 360. For example, the microcontroller 320 may transmit and receive serial data to and from the computer 180. In this example, however, because the serial communication performed by the computer 180 follows the RS232 standard, voltage levels are defined between positive and negative 15 volts. However, the PIC16F877 microcontroller described above defines voltage levels on 5 volts. Accordingly, the buffer 335 is located between the microcontroller 320 and the computer 180 to raise the voltage to the appropriate level. In this example, a MAX233 chip, manufactured by Maxim Integrated Products, Sunnyvale, Calif., may be used. The MAX233 chip contains internal charge pumps to raise the outgoing voltage to appropriate levels and step down circuitry to lower the RS232 levels to TTL. The MAX233 is connected on one end to the transmit and receive pins on the microcontroller 320, and to a standard 9 pin DB9 male serial port connector on the other.

Interface

The interface 360 transmits the output of the microcontroller 320 to the computer 180 for processing. The interface may comprise a serial port, for example. Alternatively, other interfaces may be used, such as a Universal Serial Bus (JSB) port, a parallel port, a standard PS/2 port, Ethernet, a wireless solution such as Bluetooth or wireless Ethernet (802.11x), etc. For each such implementation, supporting hardware may be needed. A serial port is shown in this example for its simplicity, and because the PIC microcontroller described above already has a serial port built-in, known as a Universal Synchronous Asynchronous Receiver Transmitter module (USART).

LED Indicator Circuit

The Light Emitting Diode (LED) indicator circuit 375 indicates whether the microcontroller 320 is fully off, fully booted, or busy. The microcontroller 320 connects between two LED and resistor pairs, one pair with a higher resistance than the other, allowing the three different states to be displayed. An advantage of using two LEDs instead of one in an on/off state is that the current circuit mode is always known. If one LED burns out for instance, using two LEDs indicates that one is broken and not that the microprocessor 320 is not working. Any one of a number of commercially available LEDs may be used.

Additional Features

The control board may include other components that are not shown, including, for example, a power segment consisting of a full wave rectifier and a power supply. A full wave rectifier prevents damage from accidentally reversing the positive and negative power leads that connect to the control board from an external power source. A five volt power supply, such as a LM7805 available from Fairchild Semiconductor, with several decoupling capacitors, ensures that the attached voltage is regulated to guarantee an output of positive five volts. In addition, a push button (not shown) with a resistor capacitor debounce circuit may be attached to the microcontroller 320. The push button is used as a reset mechanism to reset the microcontroller if so desired.

In addition to the pushbutton to reset the microcontroller 320, another button may be implemented to allow for discrete data collection. A button may be connected to an auxiliary port on the microcontroller 320 to allow for discrete data collection when the microcontroller 320 is set in "button mode,", such as may be utilized in the development of a look-up table (discussed below). A simple debounce circuit may be implemented, or a software debounce may be used.

Target Object

As the target object 160 moves within the tracking volume, its position is tracked in real-time by software operating on the computer 180. Preferably, the target object 160 is a passive unit, untethered to any object and without an onboard power source. The physical characteristics of the target object 160 are selected to correspond to those of the magnetic sensors on the sensor boards 112, 122 and 132. The target object 160 may comprise, for example, a permanent magnet of sufficient strength to allow for operation throughout the tracking volume, but not strong enough to saturate the magnetic sensors 210A-C, and the corresponding sensors on sensor boards 122 and 132, within a suitable range. Alternatively, the target object 160 may comprise other materials, including metallic or non-metallic substances. The target object 160 is preferably light enough and small enough to allow for ease of use such as by holding in the operator's hand or, alternatively, by attachment to a non-metallic and magnetically inert ring worn by the operator. Geometrically, the magnet may be in the shape of a bar magnet or a spherical/toroidal magnet. To the extent possible, it is preferable to select the target object 160 to produce a uniform magnetic field. It should be noted that while the target object 160 depicted in FIG. 1 has a circular/spherical shape for ease of illustration, the target object 160 may have other shapes and forms. For example, in one example, a bar magnet having dimensions 7 cm by 1.5 cm by 1 cm may be used.

In another embodiment, the target object 160 may comprise an LC circuit that when remotely charged is readable by the selected sensors. In this embodiment, a remote charge circuit is needed to apply an external pulse to energize the LC circuit, which produces a magnetic field in response to the pulse. The magnetic sensors should then be selected to be able to read the resulting generated field or signal. Such an embodiment may allow for the simultaneous and individual tracking of multiple objects. Multiple objects, each having a separate LC circuit having a unique resonant frequency, may be used, for example. In such case, the remote charge circuit may energize each tag through a pulse generated at the LC circuit's resonant frequency at which only the targeted LC circuit produces a response, therefore allowing differentiation between objects. Use of an active target object may be possible as well; however, use of a passive target object (void of any onboard power source) is preferable because this allows for maximum application flexibility.

Computer

Figure 4:
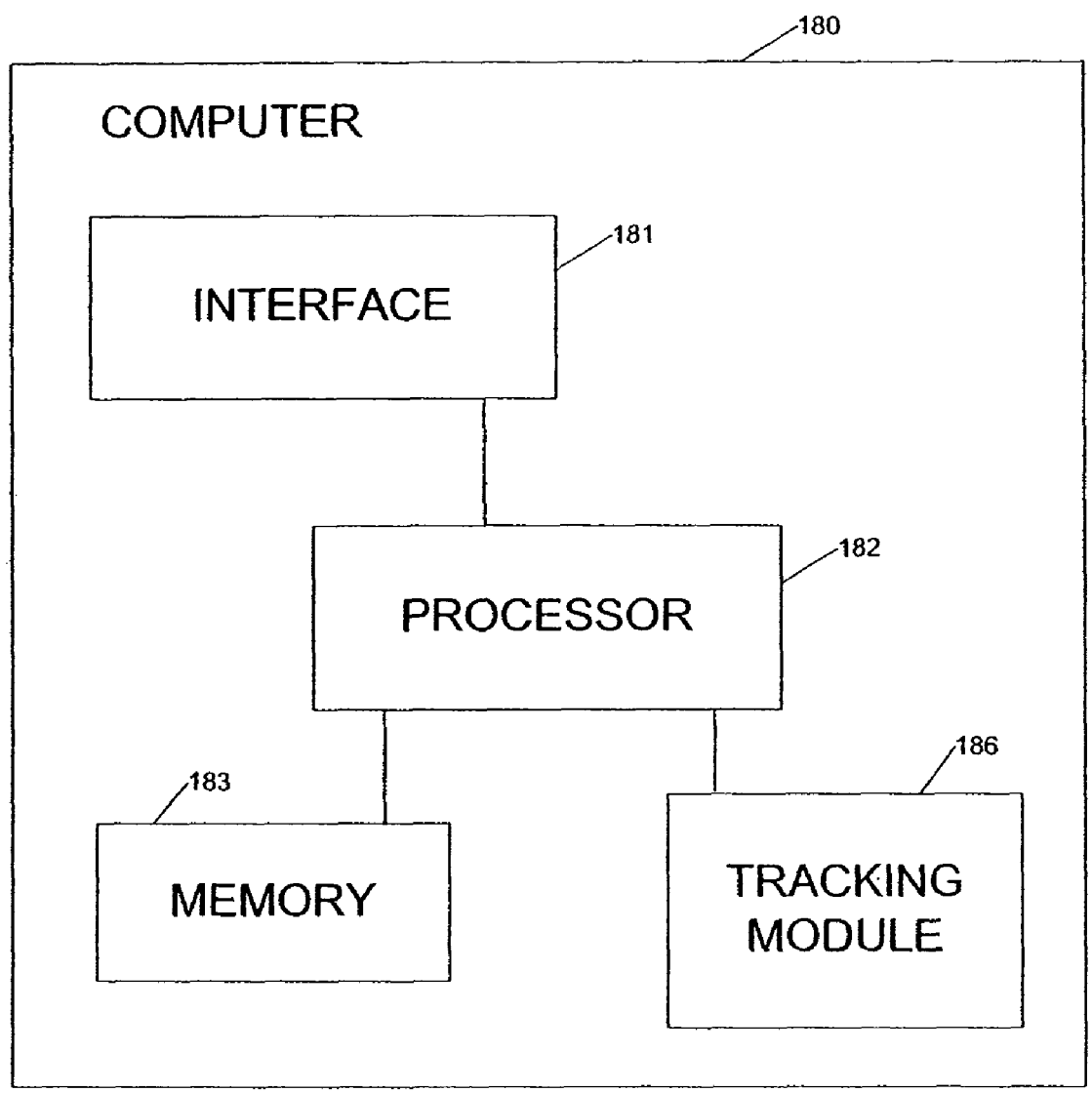
FIG. 4 is an example of a computer, in accordance with the embodiment of FIG. 1.

The computer 180 receives data from the control board 114 and analyzes the data to determine the location of the target object 160. FIG. 4 is an example of a computer 180 for use in the embodiment of FIG. 1. The computer 180 comprises an interface 181, a processor 182, a memory 183 and a tracking module 186. The computer 180 may be a personal computer (PC), for example. The tracking module 186 provides real-time data acquisition, data logging, and real-time display.

In the example shown in FIG. 4, the tracking module 186 comprises software operating on computer 180. The tracking module 186 may comprise a multithreaded program architecture, for example. This architecture comprises multiple linear programs each devoted to a specific task. This type of program architecture advantageously provides enhanced real-time data processing capabilities. Alternatively, some or all of the functions of the tracking module 186 may be implemented by hardware, such as on a separate microprocessor, a digital signal processing (DSP) chip, by using FPGA, an application-specific integrated circuit (ASIC), or even a high-powered microprocessor. Providing a complete hardware implementation is advantageous as it frees up valuable resources, provides greater speed and efficiency, and allows for the removal of all custom PC software with the exception of a simple driver. In such an implementation, a Universal Serial Bus port (USB) cable or PS/2 port, or Bluetooth may directly connect the hardware component to a computer with only a driver placed on the PC.

The tracking module 186 receives data packets provided by the microcontroller 320, analyzes the data, and generates three values representing the x, y, and z coordinates of the target object 160. Preferably, data packets received are processed in real time or near real-time to guarantee display of most current data.

In the embodiment shown in FIG. 1, the tracking module 186 receives, via the microcontroller 320, a measurement from each of the nine magnetic sensors located on the sensing device 105. In this example, the tracking module 186 receives nine measurements. The tracking module 186 then generates an observational data set having nine values, and uses the observational data set and, in one example, a look-up table to determine the location of the target object 160.

The look-up table may be generated in a variety of ways. In one example, the tracking module 186 defines a three-dimensional grid (referred to as the "tracking grid") within the tracking volume. To define the tracking grid, the tracking module 186 divides the tracking volume, which in this example is substantially cubical in shape, into multiple smaller cubic volumes, each having a volume of one cubic centimeter or smaller. Each of these smaller volumes is referred to herein as a "unit volume."

A look-up table, such as that shown in FIG. 5 is then initiated and populated with data. The look-up table may comprise a database table, such as an SQL database table. Referring to FIG. 5, look-up table 477 comprises X records, where X equals the number of unit volumes within the tracking grid. Each record, for example, record 493, is associated uniquely with a respective unit volume within the tracking grid. Within each record, column 480 holds a set of three values (x, y, z) representing a set of coordinates associated with the respective unit volume. Each of the columns 481-489 holds a value representing a sensor reading generated by a respective one of the nine sensors located on sensing device 105 when the target object 160 is located within the respective unit volume.

To generate the look-up table 477, a unit volume within the tracking grid is selected and a set of coordinates (x, y, z) is determined and associated with that particular unit volume. The target object 160 is placed in the selected unit volume, and a set of nine measurements is generated. The coordinates of the selected unit volume and the nine measurements are stored in the look-up table 477. This procedure is repeated for every unit volume within the tracking grid. For example, referring to record 493, the target object 160 may be placed in the unit volume identified by the coordinates (x1, y1, z1). The tracking module 186 receives, via the microcontroller 320, a measurement from each of the nine sensors in the system 100. Supposing that the nine measurements are $\alpha$-1, $\alpha$-2, $\alpha$-3, $\alpha$-4, $\alpha$-5, $\alpha$-6, $\alpha$-7, $\alpha$-8, and $\alpha$-9, the tracking module 186 stores the coordinates (x1, y1, z1) and the nine measurements $\alpha$-1, $\alpha$-2, $\alpha$-3, $\alpha$-4, $\alpha$-5, $\alpha$-6, $\alpha$-7, $\alpha$-8, and $\alpha$-9 in record 493. Another unit volume is selected, for example a unit volume having coordinates (x2, y2, z2), another set of measurements is collected, etc. When a set of measurements has been generated for every unit volume within the tracking grid, the procedure ends.

The method described above for generating a look-up table may be varied. In one example, the tracking module 186 may generate a value associated with a particular magnetic sensor by receiving multiple measurements from the sensor and generating a representative value for the sensor based on the multiple measurements. For example, the tracking module 186 may receive 254 measurements from each sensor, and average the 254 measurements to generate a single value for each respective sensor. In this example, the average value is stored in the look-up table.

Figure 6:
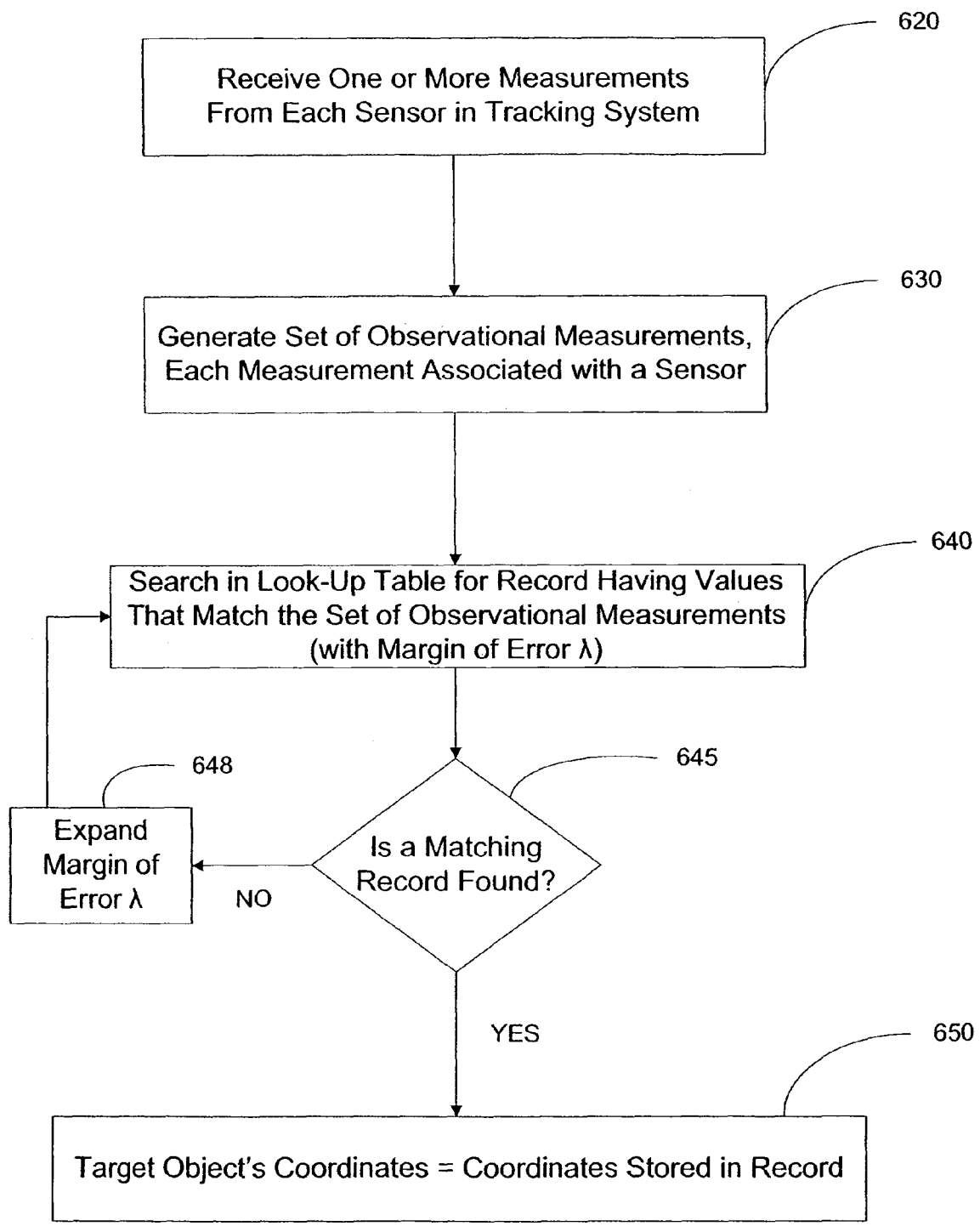
FIG. 6 is an example of a method for determining a location of the target object, in accordance with the embodiment of FIG. 1.

Once the look-up table 477 is generated, the tracking module 186 may determine a location of the target object 160 anywhere within the tracking grid based on measurements received from the nine sensors. FIG. 6 shows an example of a method for determining a location for the target object 160, in accordance with an embodiment of the invention. Let us suppose that the target object 160 is located at an undetermined location within the tracking grid. At step 620, the tracking module 186 receives an observational measurement from each of the sensors present in system 100. In this example, there are nine sensors. At step 630, the tracking module 186 assembles the measurements to generate a set of observational measurements, each associated with one of the sensors located on the sensing device 105. Thus, in this example, a set of observational measurements comprising nine values is generated. At step 640, the tracking module 186 examines the look-up table 477 and searches for a record having a set of values that match the set of observational measurements. For this purpose, the tracking module 186 examines the values in columns 481-489. To allow for some tolerance in the event an identical match is not found, the search range may be expanded. For example, at step 640, the tracking module 186 may search for a record in the table 477 having values that fall within an acceptable margin of error $\lambda$ from the observational measurements.

Referring to block 645, if a match is found, the tracking module 186 at step 650 identifies the location of the target object 160 to be defined by the coordinates stored in the selected record. If no match is found, at step 648 the acceptable margin of error $\lambda$ is expanded and the routine returns to step 640. The table 477 is then searched again for a record having values that fall within the expanded range. Alternatively, or in addition, a position may be interpolated based on the prior known position.

In an alternative example which expands on the look-up table method described above, a best-fit algorithm may be applied to the look-up table 477 to derive one or more best-fit equations describing the magnetic field produced by the target object 160 with more accuracy. For example, a multivariable position detection algorithm may be generated and used.

In an alternative embodiment, a simulation computer model may be created comprising a model of the tracking volume with a mathematical model of the system's magnetic sensors and a model target object. The model of the target object is constructed to produce the same magnetic field effects as an actual target object of a selected size, shape, composition, magnetic field strength, etc. The modeled sensors are constructed to produce the same response that desired real-world sensors would produce in response to the target object's position and movement within the tracking volume. Consequently, whether the virtual target object or the real target object is moved, similar or identical responses are produced by the real sensors and the virtual sensors. A look-up table or position-detection algorithm is then constructed from the model in a manner similar to that described above; however, a higher resolution may be achievable using such an approach than with real components. For example, each "unit volume" may be defined on the order of one cubic millimeter or less; in addition, data may be acquired with the target object positioned in a variety of orientations. To achieve even greater precision, the model may be used to construct a series of position tracking equations or even a position tracking algorithm to convert observed measurements to actual coordinates.

Figure 7:
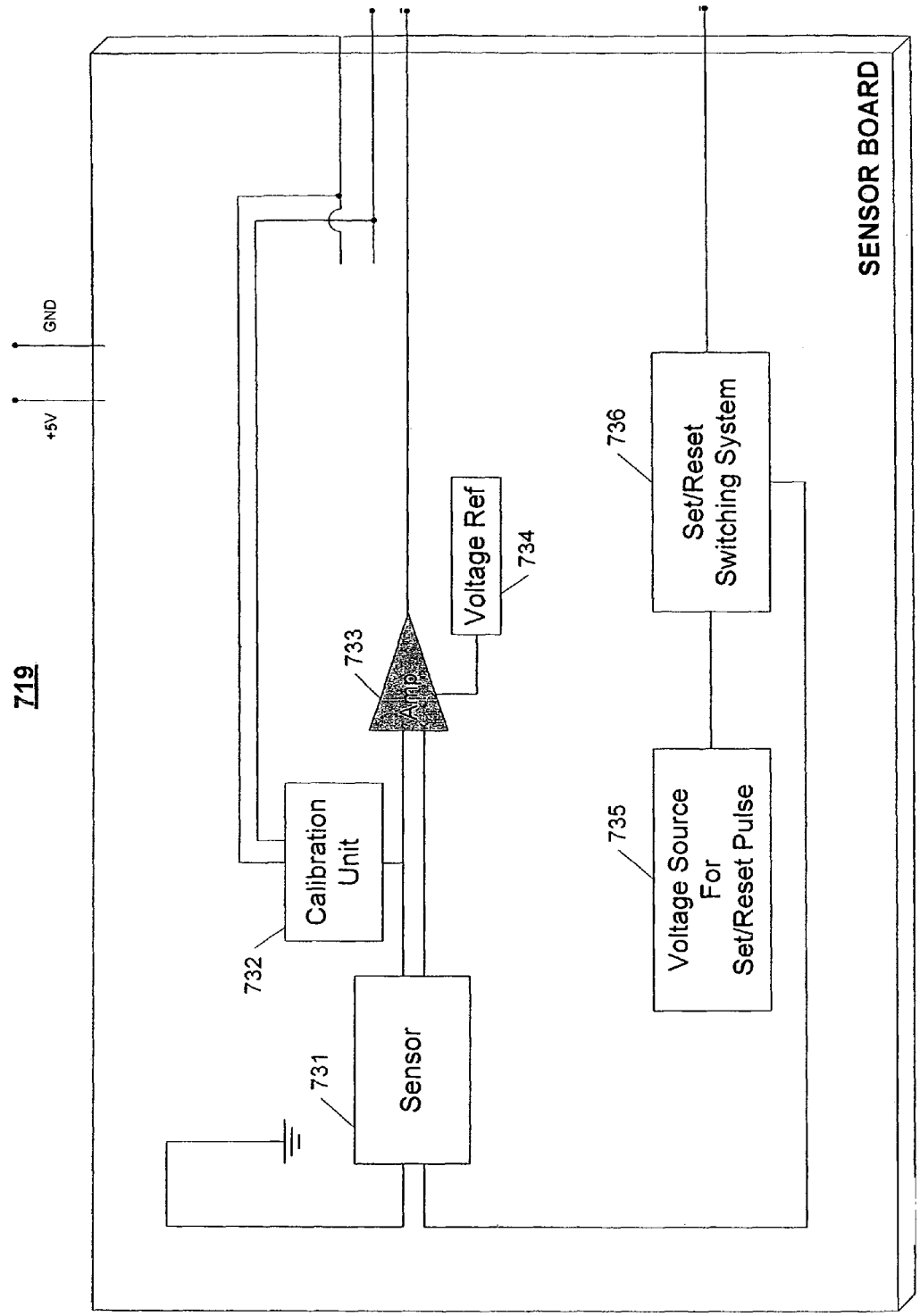
FIG. 7 is an example of a sensor board, in accordance with another embodiment of the invention.

It should be noted that although in the embodiment described herein, nine magnetic sensors are used, the number of sensors, or alternatively the number of sensor boards/operational platforms may be varied. For example, FIG. 7 shows an example of a sensor board 719 holding one magnetic sensor. Sensor board 719 comprises sensor 731, calibration unit 732, amplifier 733, voltage reference 734, voltage source 735 and set/reset switching system 736.

Various alternative embodiments may be constructed based on the concept of a "sensor set." Each sensor set includes a single sensor, a calibration unit, an amplifier and a voltage reference. Each sensor set in a particular configuration is mounted such that the sensitive axis of its sensor is aligned to measure a desired axis. Depending on the desired resolution and design, any number of sensor sets may be used. In one embodiment in which multiple platforms and multiple sensors are used, a larger area may be covered by overlapping the tracking volume of a sensor board with one or more additional sensor boards. In such an arrangement, the sensing fields associated with the various sensors overlap to increase the total sensing area.

Based on the sensor set concept, tracking systems may be constructed to track an object's position in one dimension, two dimensions, or three dimensions to a desired resolution. For example, multiple sensor boards similar to that shown in FIG. 7 may be used to construct a tracking system that includes a sensing device resembling the sides of a cube. In this example, each surface of the cube may comprise a sensor board which comprises one sensor set, similar to the sensor board 719 shown in FIG. 7. For example, three sensor boards and thus three sensors, may be used. In other embodiments, the sensing device may comprise multiple surfaces, each comprising multiple sensor sets. It is important to note that the quantity and/or power of the supporting hardware, such as the number of multiplexer connections, the power of the set/reset switching system, etc., may require adjustment based on the chosen configuration.

Other Alternative Applications

A wireless and real-time small-scale position tracking device, as described herein, may be applicable to a variety of systems, from novel computer peripherals to biological monitoring systems. In one such application, the systems and methods described herein are applied to construct and operate a three-dimensional computer mouse. A standard computer mouse is limited to two-dimensional movement, where position is recorded based on the movement of a mouse-ball with sensors located in a plastic casing that one moves with his or her hand thus causing the mouse-ball to move. Such a mouse is operable only in two dimensions as it must remain fixed on a table. Consequently, an object on a computer can only be moved in two dimensions at the same time as two selected dimensions can only be mapped to the mouse's two dimensional movement at any given time. For example, in a typical software implementation a portion of a computer aided design (CAD) drawing can be moved left or right, and/or forward or backward, but to move the drawing in a third dimension (up and down) an additional selection must be made to enter the new dimensional movement.

A three-dimensional computer mouse containing, for example, a small magnet, may be operated within a defined three-dimensional volume to allow the three-dimensional position of the mouse to be determined at all times. An alarm may be added to sound if the mouse moves outside the defined volume. Such a three-dimensional computer mouse may be used in applications ranging from 3D computer aided design (CAD) development, to 3D computer gaming. For example, a target character or object may be manipulated in three dimensions simultaneously.

In such a three dimensional computer mouse system, the target object may function as a position indicator unit of a computer mouse device. Specifically, the target object may function as a mouse "ball," but becomes a free floating body that may be manipulated by a user within a defined tracking volume. Applying the systems and methods described herein, including mapping three virtual dimensions from the computer to the physical three dimensions in which the mouse ball (target object) moves, a virtual object can be defined and virtually moved in all three dimensions simultaneously. It should be noted that a disabling button may be necessary, which would be activated when the target object hits the edge of the sensitive area to bring it back without moving the virtual object, akin to lifting the mouse off the mouse pad when it reaches the edge. In such an implementation, the virtual object is free to move in three dimensions with the free-floating movement of the target object. Thus, three real dimensions may be mapped to three virtual dimensions.

Other applications are possible in the field of medicine. The systems and methods described herein may be applicable to any medical application where the position of an object, whether biological (such as a tumor) or man-made (such as a surgical instrument) needs to be known. For example, in locating a tumor or a clogged artery, instead of injecting radioactive isotopes, as is currently practiced, a small target object such as a capsule containing a magnet and a desired medical sensor may be injected or inserted into the patient, and function as a medical diagnostic sensor capsule. Using one or more operational platforms, the position of the capsule may be monitored until the medical sensor detects the tumor or blockage at which point the position may be determined, alerting the doctor of the location of the problem. Such a system may be used for a variety of applications, ranging from blood arteries to the brain.

As another example, current procedures such as colonoscopies are invasive and can produce discomfort for a patient. In accordance with an alternative approach using the systems and methods described herein, a capsule containing sensing equipment such as a small camera, may also include a small magnet, and be ingested by a patient. In accordance with the methods described herein, the position of the capsule may then be tracked as it moves through the patient's body. Images from a mini camera in the capsule may then be correlated with a precise position within the patient's body.

In yet another example which may be useful in the case of a paralyzed patient, a magnet may be attached to the patient's tongue, such as through a tongue ring, and a sensor platform placed behind and/or around the head. As the patient moves his/her tongue, the sensor board picks up the resulting position movement. Such a system may allow the patient to control objects including, for example, a computer's cursor to a wheel chair by moving his/her tongue in an appropriate direction.

In still another alternative application of the systems and methods described herein, a sensor may be developed to reduce the incidence of sudden infant death syndrome (SIDS). In one example, a target object comprising a small magnet or other such object may function as a cardiopulmonary status indicator. The target object is attached to the clothing of an infant in proximity to the infant's chest. One or more sensor platforms are placed near the sleeping child such that the three-dimensional position of the sensor may be known at all times. A software algorithm may monitor the sensor's position, and if a defined up-down or side-to-side, or other such motion associated with the child's breathing stops for more than a predetermined period of time, an alarm is activated to alert the child's parent or guardian.

It is to be noted that system 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors. Such an arrangement may include one or more application-specific integrated circuits (ASICs), for example. Alternatively, any one or more of these functions may be implemented by software, by hardware, or by a combination of software and hardware.

The foregoing merely illustrates the principles of the invention. It will thus be appreciated that those skilled in the art will be able to devise numerous other arrangements which embody the principles of the invention and are thus within its spirit and scope, which is defined by the claims below.

What is claimed is:

1. A computer cursor position tracking system, comprising:
 a computer;
 a display device coupled to the computer;
 a three dimensional tracking volume comprising at least first, second, and third orthogonal platforms physically connected to define a three-dimensional space having a predetermined volume;
 at least first, second, and third magnetoresistive integrated circuit sensors mounted to the first, second, and third platforms, respectively, the sensors being orthogonally aligned;
 a computer mouse coupled to the computer, the computer mouse comprising a permanent magnet generating a magnetic field, the permanent magnet being freely movable in three dimensions within the tracking volume;
 the first, second, and third magnetoresistive integrated circuit sensors configured to detect respective components of an intensity of the magnetic field generated by the permanent magnet, wherein the sensors are separate from the at least one permanent magnet, the detected components of the intensity being dependent, at least in part, on the proximity of the permanent magnet to a respective sensor;
 the computer comprising at least one processor configured to:
 determine the position of the permanent magnet within the tracking volume based, at least in part, on the detected magnetic field; and
 display a computer cursor on the display device in a position corresponding to the determined position of the permanent magnet within the tracking volume.

2. The system of claim 1, further comprising:
 a storage configured to store a look-up table correlating coordinates representing a location and respective sets of one or more values representing components of the detected magnetic field;
 the at least one processor being further configured to:
 determine the position of the movable permanent magnet based, at least in part, on the detected magnetic field and the look-up table.

3. The system of claim 1, wherein the processor is configured to activate an alarm if the permanent magnet is moved outside of the tracking volume.

4. The system of claim 1, wherein the first, second, and third magnetoresistive integrated circuit sensors each comprise three orthogonally aligned magnetoresistive integrated circuit sensors supported on each of the first, second, and third platforms.

5. The system of claim 4, further comprising:
 first, second, and third circuit boards to support each of the three orthogonally aligned magnetoresistive integrated circuit sensors, respectively, the first, second, and third circuit boards being supported by the first, second, and third platforms, respectively.

6. The system of claim 1, wherein the at least one processor is configured to determine the position of the permanent magnet within the tracking volume by a multithreaded program architecture.

7. The system of claim 1, wherein the computer mouse comprises a ring-shaped device to be moved by a body part of a user, the ring-shaped device including the permanent magnet.

8. The system of claim 7, wherein the body part is a finger of the user and the ring-shaped device is configured to be worn on a user's finger.

9. The system of claim 1, further comprising:
first, second, and third circuit boards to support the first, second, and third sensors, respectively, the first, second, and third circuit boards being supported by the first, second, and third platforms, respectively.

10. The system of claim 2, wherein the at least one processor is configured to determine the position of the permanent magnet based, at least in part, on the lookup table and a best fit equation.

11. A method for controlling a position of a cursor on a computer display, the method comprising:
defining a three dimensional tracking volume by at least first, second, and third orthogonal platforms physically connected to define a three-dimensional space, the first, second, and third platforms having mounted thereto at least first, second and third stationary magnetoresistive integrated circuit sensors, respectively, the first, second, and third sensors being orthogonally aligned, and the tracking volume having a predetermined volume;
moving a computer mouse comprising a permanent magnet within the three-dimensional space of the tracking volume by a body part of a user, the computer mouse being freely movable within the tracking volume;
detecting by the first, second, and third magnetoresistive integrated circuit sensors respective components of an intensity of a magnetic field generated by the permanent magnet of the computer mouse, the respective detected components of the intensity being dependent, at least in part, on the proximity of the permanent magnet to a respective sensor;
determining the position of the permanent magnet within the tracking volume in three-dimensions based, at least in part, on the respective detected components of the magnetic field detected by the first, second, and third magnetoresistive integrated circuit sensors; and
displaying a computer cursor on the computer display in a position corresponding to the determined position of the permanent magnet within the tracking volume.

12. The method of claim 11, comprising determining the position of the permanent magnet within the tracking volume by:
examining a look-up table correlating at least one first set of one or more coordinates representing a location within the tracking volume, a set of one or more values representing the respective detected components of a magnetic field, and at least one second set of one or more coordinates representing a location on a computer display corresponding to the location within the tracking volume.

13. The method of claim 11, wherein the first, second, and third sensors are mounted on first, second, and third circuit boards, respectively, mounted on the first, second, and third platforms, respectively.

14. The method of claim 11, wherein the computer mouse comprises a ring-shaped device and the permanent magnet is part of the ring-shaped device, the method further comprising:
moving the ring-shaped device within the tracking volume by the user's body part.

15. The method of claim 14, wherein the body part is a finger of the user and the ring-shaped device is configured to be worn on a user's finger, the method comprising:
moving the ring-shaped device within the tracking volume by the user's finger.

16. The method of claim 11, comprising displaying the computer cursor on the computer display in a computer aided design (CAD) drawing.

17. The method of claim 11, comprising displaying the computer cursor on the computer display in a three-dimensional computer game.

18. The method of claim 11, further comprising activating an alarm if the permanent magnet is moved outside of the tracking volume.

19. The method of claim 11, wherein the first, second, and third magnetoresistive integrated circuit sensors each comprise three, orthogonally aligned magnetoresistive integrated circuits supported on each of the first, second, and third platforms, respectively.

20. The method of claim 19, further comprising:
first, second, and third circuit boards to support the three orthogonally aligned magnetoresistive integrated circuit sensors, respectively, the first, second, and third circuit boards being supported by the first, second, and third platforms, respectively.

21. The method of claim 11, comprising determining the position of the permanent magnet within the tracking volume by a processor of a computer coupled to the computer display.

22. The method of claim 12, comprising determining the position of the permanent magnet within the tracking volume based on the lookup table and a best fit equation.

23. The method of claim 14, wherein the body part is a tongue of a user, the method comprising:
moving the computer mouse by the tongue of the user, within the tracking volume.

* * * * *